United States Patent [19]

Alas

[11] Patent Number: 4,545,473
[45] Date of Patent: Oct. 8, 1985

[54] TORSION DAMPING DEVICE FOR AN AUTOMOTIVE CLUTCH PLATE ASSEMBLY WITH TWO FRICTION WASHERS, ONE OF WHICH IS FREELY SLIDABLY MOUNTED

[75] Inventor: Jacques Alas, Enghien-les-Bains, France

[73] Assignee: Valeo, Paris, France

[21] Appl. No.: 349,267

[22] Filed: Feb. 16, 1982

[30] Foreign Application Priority Data

Feb. 25, 1981 [FR] France ................. 81 03720

[51] Int. Cl.$^4$ ............................ F16D 3/14
[52] U.S. Cl. ..................... 192/106.2; 192/70.17; 464/68; 464/81
[58] Field of Search ............. 192/106.2, 70.17; 464/68, 66, 67, 81

[56] References Cited

U.S. PATENT DOCUMENTS

| | | | |
|---|---|---|---|
| 4,018,320 | 4/1977 | Schrape et al. | 192/106.2 |
| 4,222,476 | 9/1980 | LeBrise | 192/106.2 |
| 4,376,477 | 3/1983 | Loizeau | 192/106.2 |
| 4,398,625 | 8/1983 | Beccaris | 192/106.2 |

FOREIGN PATENT DOCUMENTS

| | | | |
|---|---|---|---|
| 2218504 | 9/1974 | France | |
| 1487557 | 3/1976 | United Kingdom | 192/106.2 |

Primary Examiner—Rodney H. Bonck
Assistant Examiner—David D. House
Attorney, Agent, or Firm—Charles A. Brown; Charles E. Brown

[57] ABSTRACT

A torsion damping device for an automotive clutch plate assembly comprising two rotary parts, i.e. a hub with a hub disc and a pair of guide washers fixed to a friction disc. First and second spring stages are operatively circumferentially interposed between the rotary parts, the first stage spring(s) having relative low stiffness and being operative during small relatively angular displacements of the rotary parts and the second stage spring(s) having relatively high stiffness and being operative during larger relative angular displacements of the rotary parts. A friction washer in frictional engagement between the rotary parts and producing most of the frictional torque is freely angularly mounted and has a position in the rest position of the torsion damping device independent of the springs. The angles subtended by the circumferential play J between second stage spring(s) and one of the rotary parts and the circumferential play L between a lug associated with the friction washer being such that the subtended angle corresponding to J−L is between a value greater than 0° (preferably 1°) and 5°.

22 Claims, 22 Drawing Figures

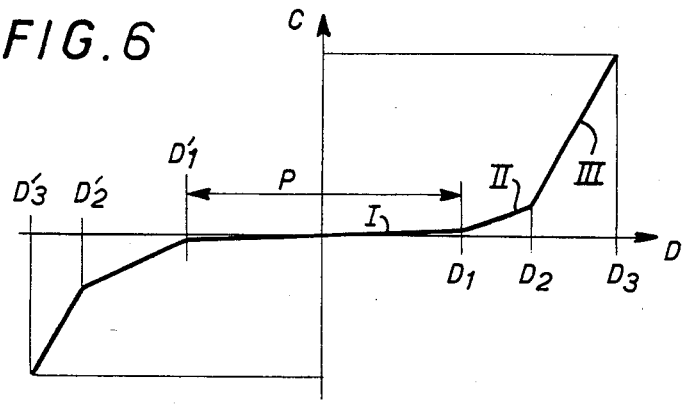
FIG. 6
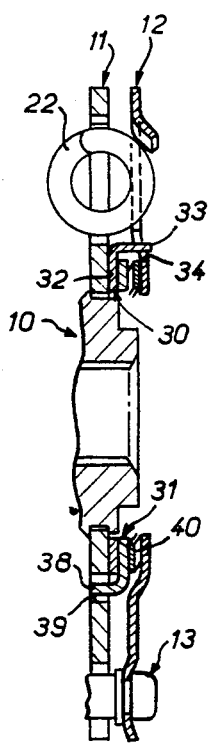
FIG. 7
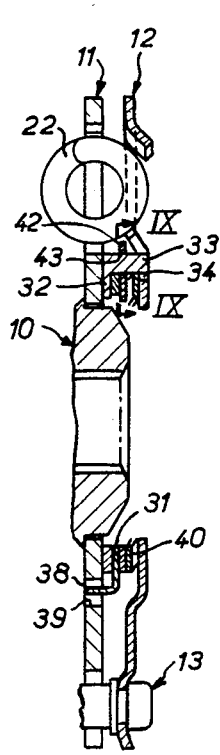
FIG. 8
FIG. 9
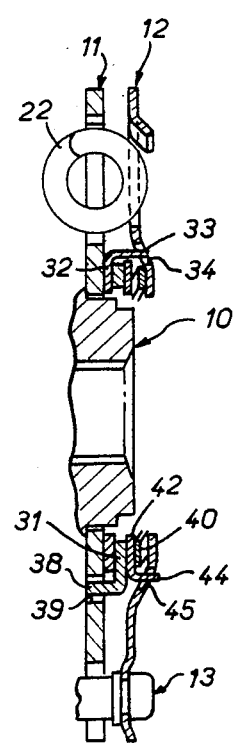
FIG. 10

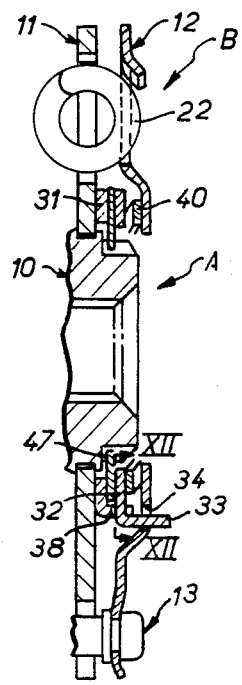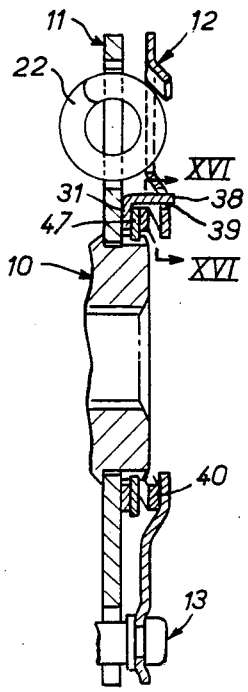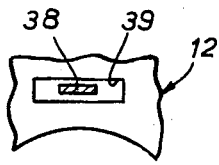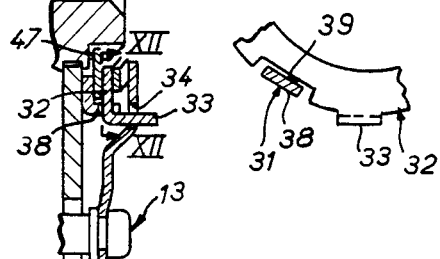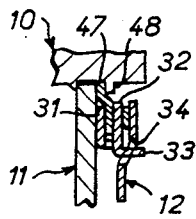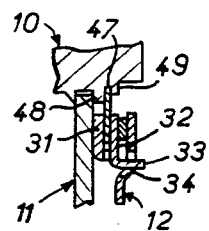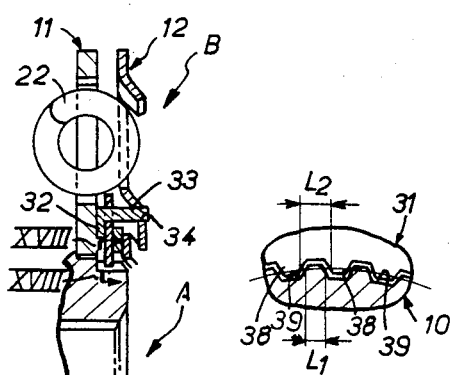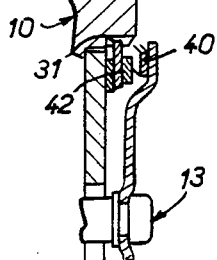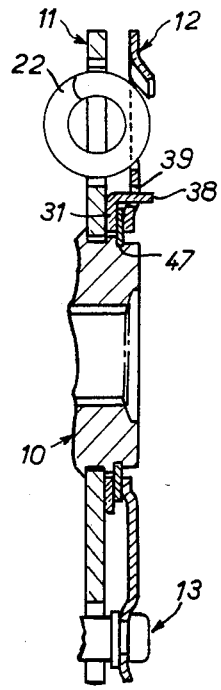

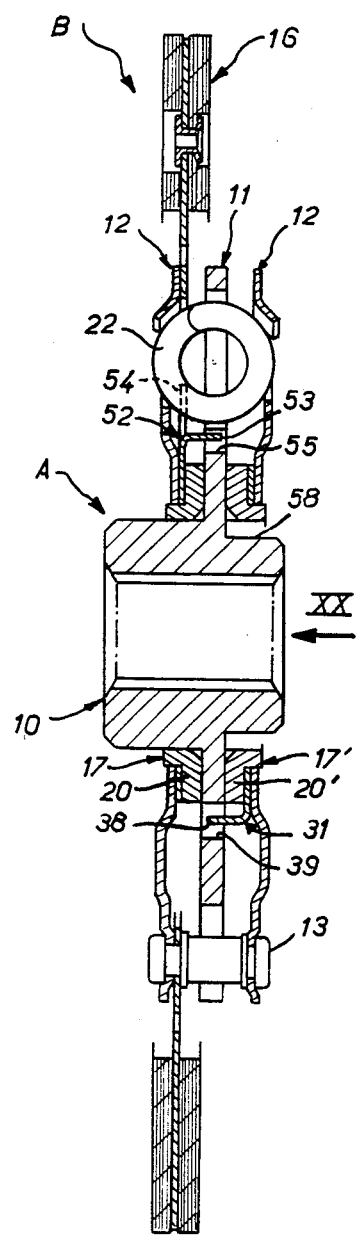
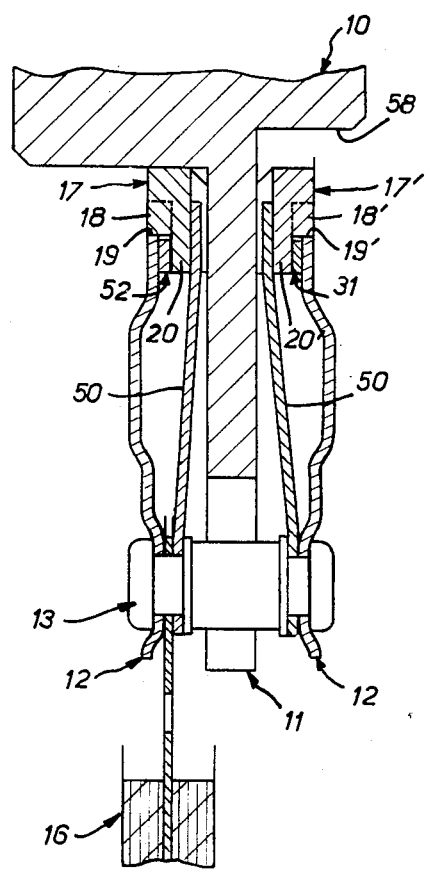

TORSION DAMPING DEVICE FOR AN AUTOMOTIVE CLUTCH PLATE ASSEMBLY WITH TWO FRICTION WASHERS, ONE OF WHICH IS FREELY SLIDABLY MOUNTED

BACKGROUND OF THE INVENTION

The present invention relates, in general terms, to torsion-damping devices of the type comprising at least two coaxial parts, one exciting and the other excited, which are mounted to rotate relative to one another within the limits of a specific angular movement, and elastic means interposed circumferentially between said parts.

As is known, such a torsion-damping device is conventionally used in the construction of a clutch plate assembly, especially for a motor vehicle, in which case one of its rotary parts carries a friction disc intended to be made to rotate integrally with a first shaft, in practice a driving shaft, the output shaft of the engine in the case of a motor vehicle, and thus forms an exciting part, whilst the other of its rotary parts is carried by a hub intended to be made to rotate integrally with a second shaft, in practice a driven shaft, the input shaft of a gearbox in the case of such a motor vehicle, and thus forms an excited part.

Such a device makes it possible, in fact, to ensure regulated transmission of the torque applied to one of its rotary parts when the other is itself subjected to a torque, that is to say to filter the vibrations capable of arising over the entire length of the kinematic chain in which it is inserted and which extends from the engine to the controlled wheel shafts in the case of a motor vehicle.

Most often, the elastic means interposed circumferentially between the two rotary parts of such a torsion-damping device comprise conventionally a plurality of springs which all extend substantially tangentially to a circumference of the assembly and which are each located partly in a housing formed in a first of these rotary parts and partly in a housing formed in the second of these rotary parts, arrangements being made to ensure that these springs intervene in stages during successive portions of the angular movement between said rotary parts, for the purpose of an increase, modulated in a specific way, in the overall rigidity due to these springs, this rigidity having to be relatively low for low torques at the start of the angular movement and relatively high for high torques at the end of this angular movement.

In practice, these arrangements result from the fact that at least one of the springs in question is, as regards the configuration of the rest of the assembly, located without any circumferential play in the corresponding housing of a first of the rotary parts, and with a circumferential play J1 for a first direction of rotation of said assembly and J2 for the opposite direction of rotation, in the corresponding housing of the second of said rotary parts.

In fact, in a first stage, and therefore for low torques, this spring has no effect, and it comes into action only in a second stage after the corresponding circumferential play J1 or J2 has been absorbed.

Thus, in a first stage, the only springs which may be capable of intervening are those which, in practice, are springs of relatively low rigidity, whilst, in a second stage, the effects of springs of relatively high rigidity are added to the effects of these springs of relatively low rigidity.

At the same time, friction means interposed between the two rotary parts in question intervene.

These friction means conventionally comprise at least one friction washer which is driven to rotate with one of said rotary parts through at least one range of the angular movement between these, and which is in contact with the other of said rotary parts with at least one of its faces.

The purpose of these friction means is to introduce a "hysteresis" effect into the development of the torque transmitted from one of the rotary parts to the other as a function of the angular movement between them, that is to say, to lead, for a given value of this movement, to a differentiation between the value of the corresponding torque for an increasing development of this torque and the value of this torque for a decreasing development thereof, this being favorable to the absorption of energy necessary for the desired filtration.

A dual problem has to be overcome in the production of torsion-damping devices of this type.

First of all, it is desirable that the hysteresis introduced by the friction means used should differ according to the rigidity of the active elastic means.

In practice, this hysteresis can be substantial only when the active elastic means have high rigidity, since the energy to be absorbed is then substantial itself.

On the other hand, when the active elastic means have only relatively low rigidity, this being the case, as indicated above, for low torque values, it is preferable for the hysteresis generated by the friction means used to be low, otherwise there is a risk of "cancelling" or "suppressing" these elastic means, preventing them from acting.

Furthermore, and in conjunction with this, the range of angular movement during which only elastic means of low rigidity are therefore active, as required for good filtration of noises, called neutral noises, which are generated during idling of the engine of a stationary vehicle, with the gearbox in neutral, generally cannot be as wide as desired both because the extension of such a range comes up against the requirements of mechanical construction and bulk of the torsion-damping device in question, within which the available circular space necessary for such an extension is inevitably limited, and because, outside the idling operation for which they are thus provided, these elastic means of low rigidity cause, at each momentary release of the accelerator pedal and/or at each change of gear, an unpleasant "rocking" effect.

Now, in practice, at idling speed, and assuming the amplitude of the oscillations of the exciting rotary part to be constant with the temperature, the corresponding oscillations of the excited part are generated on either side of a mean position which does not correspond to a zero angular movement between said parts, because a parasitic torque, called a drag torque, exists, on the contrary, between these parts and leads to the presence of a non-zero angular movement between them.

This drag torque which is relatively large in cold running decreases with temperature.

In practice, only a portion of the range of angular movement corresponding to the elastic means of low rigidity is actually used for the oscillations of the exciting part at idling speed.

However, the result of the drag torque which exists at that time is that the location of this portion in this range varies with the temperature.

If this drag torque is sufficiently large, this being the case in cold running, and if, for the reasons set out above, the extension of the range of angular movement corresponding to the elastic means of low rigidity is limited, it can happen that, at idling speed, the oscillations of the excited part lead the latter to come in contact with the elastic means of high rigidity, which are not normally intended to come into action until the next range of this angular movement.

The abrupt increase in rigidity which then occurs never fails to result in an accelerated backward rebound of the excited part which leads the latter to move prematurely not only over a portion of the range of the angular movement corresponding to the elastic means of low rigidity, according to oscillations caused simply by those of the exciting part, but over the whole of this range, in successive rebounds to the ends of this, a pronounced specific noise being produced.

The subject of the present invention is, in general terms, an arrangement which makes it possible, in a very simple way, to mitigate the consequences of such a rebound, and which also leads to other advantages.

SUMMARY

More precisely, the subject of the present invention is a torsion-damping device, particularly a clutch plate assembly, especially for a motor vehicle, of the type comprising at least two coaxial parts mounted to rotate relative to one another within the limits of a specific angular movement, elastic means interposed circumferentially between said rotary parts, and friction means interposed between the latter, said elastic means comprising at least one spring which extends substantially tangentially to a circumference of the assembly and which, as regards the configuration of rest of said assembly, is located partly, without circumferential play, in a housing formed in a first of the rotary parts and partly, with a circumferential play $J1$ for one direction of rotation of said assembly and $J2$ for the opposite direction, in a housing formed in the second of said rotary parts, and said friction means comprising at least one friction washer which is in contact with either of the two rotary parts with at least one of its faces, this torsion-damping device being characterized in that between said friction washer and the other of said rotary parts there is a lug which, originating from any one of the elements formed by said friction washer and said other rotary part and having a circumferential development $L1$, is engaged in a passage, such as an aperture or notch, of a circumferential development $L2$, in the other of said elements, the values of the circumferential plays $J1$, $J2$ and of the circumferential developments $L1$, $L2$, measured angularly, being such that the difference $[(J1+J2)-(L2-L1)]$ is between 0° and 5° and preferably between 1° and 5°.

Thus, such a friction washer comes into action, in practice, only when, with regard to the direction of rotation in question, the lug associated with it rests against the corresponding circumferential end of the passage in which it is engaged.

The friction washer which has remained inactive until then and which has therefore in no way cancelled, until then, the normal play of the elastic means of low rigidity, then adds its effects systematically to the other friction means used simultaneously in the torsion-damping device in question, preferably introducing a friction torque which is a multiple of that resulting from these, in such a way that, in the case of a rebound of the excited part in relation to the exciting part, under the conditions set out above, it minimises the consequences of such a rebound, ensuring accelerated damping of the latter.

In practice, by construction and in view of the intended applications, the difference $(L2-L1)$ is selected so as to be sufficient to ensure that, in stabilized operation, the friction washer according to the invention does not intervene, whatever the temperature, and that it thus allows free play to the elastic means of low rigidity for normal filtration of the neutral noises.

Experience shows that, with the difference $(L2-L1)$ being determined in this way, the bracketing values mentioned above for the difference $[(J1+J2)-(L2-L1)]$ effectively lead, with certainty, to an accelerated damping of a possible rebound of the excited part in relation to the exciting part as a result of the absorption energy supplied then, but only then, by the friction washer.

Furthermore, since the friction washer is also mounted to slide freely about the axis of the assembly, it advantageously intervenes without an attendant compression of any one particular elastic means capable of subsequently restoring the energy which it has stored during such a compression, so that the momentary unilateral displacement of this friction washer with regard to one direction of development of the movement between the two rotary parts in question does not necessarily imply the elastic return of this friction washer to its initial position when the direction of development of said movement is reversed.

On the contrary, the instantaneous position of the friction washer according to the invention results from the prior operating conditions and is therefore any position.

However, whatever this position, the friction washer constitutes in itself a reserve of absorption energy, which advantageously comes into action only in case of need, without being detrimental to the normal operating conditions of the assembly.

BRIEF DESCRIPTION OF THE DRAWINGS

FIG. 6 is a diagram illustrating the operation of the torsion-damping device according to the invention;

FIG. 7 partly repeats FIG. 2 and relates to an alternative embodiment;

FIG. 8 also partly repeats FIG. 2 and relates to another alternative embodiment;

FIG. 9 is a partial view of this alternative embodiment in a cross-section along the line IX—IX of FIG. 8;

FIG. 10 is a view partly repeating that of FIG. 2 and relates to another alternative embodiment;

FIG. 11 also partly repeats that of FIG. 2 and relates to another alternative embodiment;

FIG. 12 is a view of this alternative embodiment in a partial cross-section along the line XII—XII of FIG. 11;

FIG. 13 partly repeats that of FIG. 11 and relates to an alternative embodiment;

FIG. 14 also partly repeats that of FIG. 11 and relates to another alternative embodiment;

FIGS. 15 and 16 are views similar to those of FIGS. 11 and 12 respectively and relate to another alternative embodiment;

FIG. 17 partly repeats that of FIG. 2 and relates to another alternative embodiment;

FIG. 18 is a partial view of this alternative embodiment in a cross-section along the line XVIII—XVIII of FIG. 17;

FIG. 19 partly repeats that of FIG. 2 and relates to another alternative embodiment;

FIGS. 20 and 21 are views similar to those of FIGS. 1 and 2 respectively and relate to another alternative embodiment with FIG. 20 being an elevational view taken in the direction of the arrow XX of FIG. 21 and FIG. 21 being a sectional view taken along line XXI—XXI of FIG. 20; and FIG. 22 is, on a larger scale, a partial view of this alternative embodiment in an axial section along the line XXII—XXII of FIG. 20.

DESCRIPTION OF THE PREFERRED EMBODIMENTS

These figures illustrate by way of example the application of the invention to the production of a clutch plate assembly with a damping hub for a motor vehicle.

In the exemplary embodiment illustrated, this clutch plate assembly comprises, in general terms, two coaxial parts mounted to rotate relative to one another within the limits of a specific angular movement.

Figure 3:
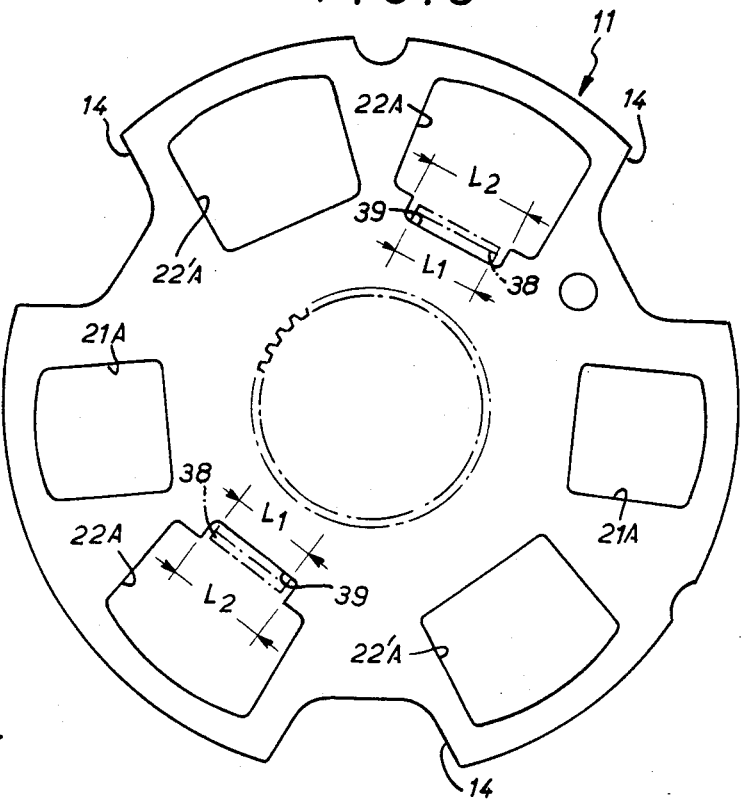
FIG. 3 is an elevation view of the hub disc forming part of this torsion-damping device, shown in isolation.

There is therefore, first of all, a first part A which possesses, in the exemplary embodiment illustrated, a hub 10 which is slotted on the inside to make it rotate integrally with a shaft, in practice a driven shaft, the input shaft of the gearbox of the vehicle in question, and which carries on the outside and projecting radially, in its central region, a hub disc 11 which rotates integrally therewith; for example, and as illustrated, this hub disc 11, which is shown in isolation in FIG. 3, is attached by crimping to the hub 10 according to a technique which, being well known per se, will not be detailed here, but it can also be a hub disc in one piece with the hub 10.

Then, there is a second part B which possesses, in the exemplary embodiment illustrated, two guide washers 12 which extend transversely in relation to the axis of the hub 10 on either side of the hub disc 11 and at a distance from the latter and which are connected to one another in places by axial struts 13 passing with play through passages 14 made for this purpose in the hub disc 11 on the periphery of the latter; in practice, the two guide washers are identical to one another.

The second rotary part B also possesses a friction disc 16 which is made to rotate integrally with the guide washers 12, in contact with one of these, by means of the same axial struts 13 which connect these guide washers 12 to one another.

Located on the inner periphery of the guide washer 12, to which the friction disc 16 is coupled, is a bearing 17 which is interposed between the hub 10 and this guide washer 12 and which is wedged to rotate on this.

In the embodiments illustrated in the Figures, this bearing has, in places, bosses 18, projecting radially for this purpose, by means of which it fits into notches 19 made in a complementary manner on the inner periphery of the guide washer 12.

Moreover, in the exemplary embodiment illustrated, the bearing 17 has transversely, parallel to the guide washer 12 in question, but at a distance from this, a radial collar 20 which is in contact with the hub disc 11.

Elastic means are interposed circumferentially between the rotary parts A, B.

These elastic means have a range of several levels of elastic means of different rigidities.

There is, first of all, a first level or stage of relatively lower rigidity.

In the exemplary embodiments illustrated, the elastic means of this first level of rigidity comprise two springs 21 which, in substantially diametrically opposite positions relative to one another, both extend substantially tangentially to a circumference of the assembly and which are each located individually partly in a housing 21A formed in the rotary part A, this being, in practice, an aperture made in the hub disc 11 which this rotary part A possesses, and partly in a housing 21B formed in the rotary part B, this being, in practice, apertures in the guide washers which this rotary part B possesses, those in one of these guide washers 12 corresponding to those in the other.

Figure 1:
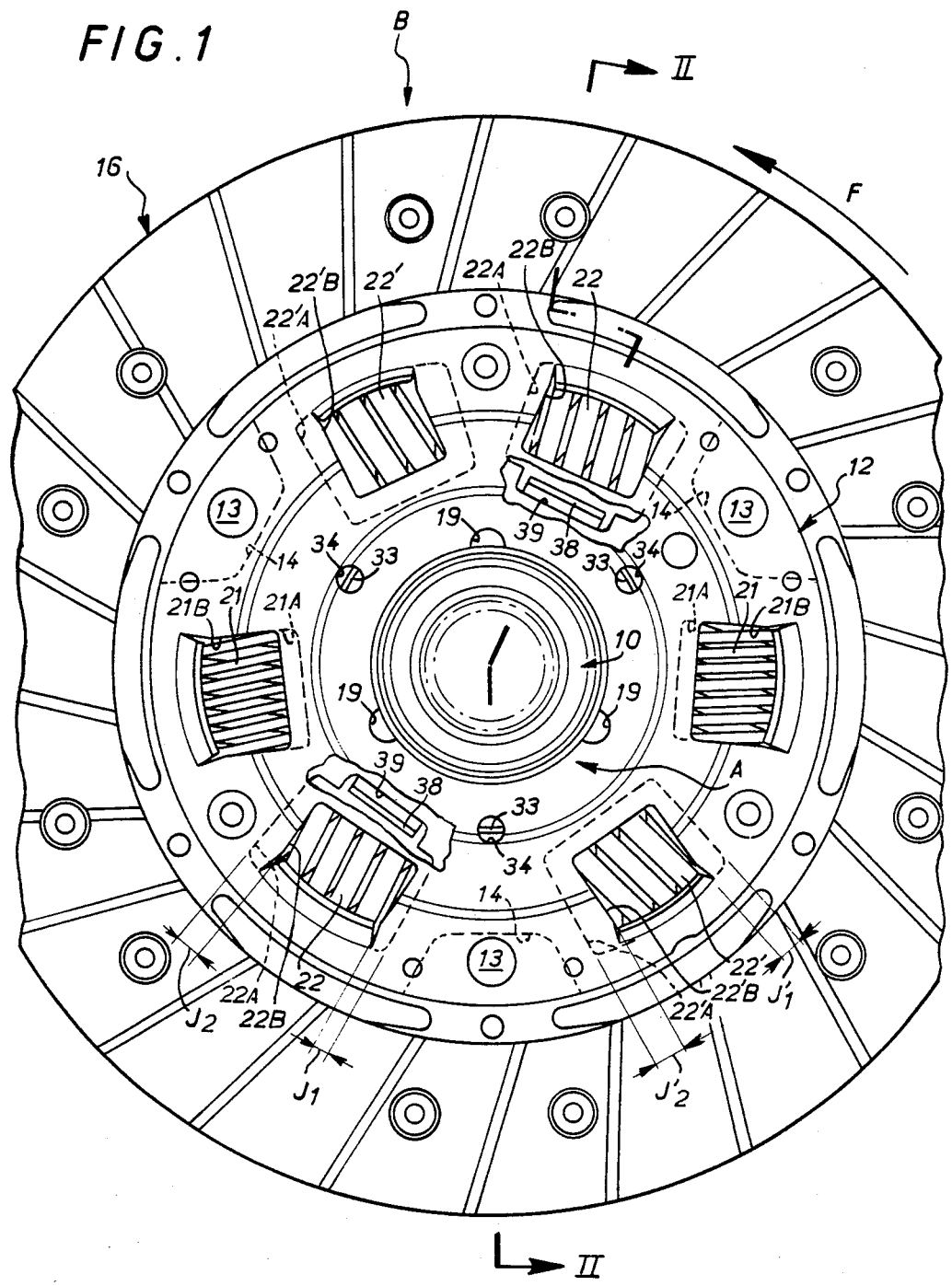
FIG. 1 is a partial elevation view, according to the arrow I of FIG. 2 and with two local cut-away portions, of a torsion-damping device according to the invention.

When the clutch plate assembly is at rest, as shown in FIG. 1, the springs 21 are engaged without circumferential play both in their housing 21A and in their housing 21B, these housings having one and the same circumferential extent.

According to an alternative embodiment not illustrated, the housings 21A extend circumferentially more in a first direction than in the other, and, conversely, the housings 21B extend non-circumferentially less in said first direction than in the other, measured from a common central diametral plane; in such a case, and in a way known per se, the springs 21 are mounted in opposition, one expanding when the other is compressed, and vice versa.

Then there is a second level of elastic means of relatively greater rigidity.

In the exemplary embodiment illustrated, these are, as before, springs 22, 22' which extend substantially tangentially to a circumference of the assembly, which is the same as for the springs 21, and which are located partly in housings 22A, 22'A formed in the rotary part A and partly in housings 22B, 22'B formed in the rotary part B, according to arrangements similar to those described above.

However, when the plate assembly is in the condition of rest, whereas the springs 22, 22' are engaged without circumferential play in their housings 22B, 22'B of the rotary part B, there is a circumferential play between each of the circumferential ends of these springs and the corresponding portion of the housings 22A, 22'A of the rotary part A in which they are likewise located.

For "traction" operation of the assembly, as indicated, for example, by the arrow F in FIG. 1, that is to say for an operation of said assembly corresponding to an increasing development of the torque between the two rotary parts A, B constituting it, this circumferential play has the value J1 for the springs 22, of which there are two in the exemplary embodiment illustrated, being located in substantially diametrically opposite positions relative to one another, and J'1 for the springs 22', of which there are also two in the exemplary embodiment illustrated, being arranged in substantially diametrically opposite positions relative to one another, each pair of springs 22, 22' alternating with the springs 21.

For operation of the assembly "on the overrun", that is to say for an operation corresponding to a decreasing development of the torque between the two rotary parts A, B, the circumferential play between the springs 22, 22' and their housings 22B, 22'B has the value J2 for the springs 22 and the value J'2 for the springs 22'.

In the exemplary embodiment illustrated, the play J1, and the play J'1 are respectively less than the play J2 and the play J'2; alternatively, they could be equal.

Moreover, in the exemplary embodiment illustrated, the plays J1, J2 associated with the springs 22 are respectively less than the plays J'1, J'2 associated with the springs 22'.

During operation, because of these values of the circumferential play J, activation of the springs 22, 22' is delayed and staggered, as illustrated in the diagram of FIG. 6.

In this diagram, the angular movement D between the rotary parts A, B has been plotted on the abscissae and the torque C transmitted between these rotary parts A, B has been plotted on the ordinates.

When, for traction operation of the assembly, a torque C is applied to the part B, for example, which consequently constitutes an exciting part, for transmission to the part A which therefore constitutes an excited part, the springs of relatively lower rigidity 21 are, first of all, the only ones to intervene.

The curve representing this first phase of operation is a straight line I, the slope of which is proportional to the rigidity of the springs 21.

This first phase of operation continues until, for a value D1 of the angular movement, the circumferential play J1 associated with the springs 22 is absorbed.

From this moment, the springs 22 come into action and add their effects to those of the springs 21.

The curve representing this second phase of operation is therefore a straight line II with a slope greater than that of the preceding straight line I.

This second phase of operation continues until, for a value D2 of the angular movement, the play J'1 associated with the springs 22' is absorbed in turn.

The springs 22' come into action in turn and, from that moment, add their effects to those of the springs 22 and 21.

The curve representing this third phase of operation is therefore a straight line III with a slope greater than that of the preceding straight line II.

This third phase of operation itself continues until, for a value D3 of the angular movement, there is a positive drive of the rotary part A by the rotary part B, either because the turns of all or some of the springs 21, 22, 22' join together or because the axial struts 13 come to rest against the corresponding portion of the passage 14 through which they pass.

For operation of the assembly "on the overrun", the reverse process to that described above takes place, for successive values of the angular movement D'1, D'2 and D'3.

Thus, in general, for the low torque values, only the springs 21 of relatively lower rigidity intervene, over a range P of the angular movement extending from a positive angular movement D1 to a negative angular movement D'1 and such that $P = J1 + J2$.

The foregoing description has not taken into account the friction which introduces into the operation of the assembly a "hysteresis" effect, that is to say a differentiation, for one and the same value of the angular movement, between the value of the torque transmitted between the rotary parts A, B for an increasing development of this torque and the value of this same torque for a decreasing development of this.

Apart from unavoidable internal friction, friction means are specifically interposed for this purpose between the rotary parts A, B for the purpose of damping the oscillations and vibrations and consequently the noises, especially noises generated in neutral, with the vehicle stationary.

These friction means conventionally comprise one or more friction washers which are in contact with any one of the two rotary parts A, B with at least one of their faces and which, for all or part of the angular movement between these, are driven to rotate with the other of said rotary parts A, B.

By a friction washer is meant here both a simple free washer made of any material, but chosen for its friction qualities, and the assembly consisting of an application washer and a friction lining attached in a suitable way, for example by bonding, to such an application washer.

In the embodiments illustrated in the Figures, two friction washers 30, 31 are used in association with one another.

The first, the friction washer 30, acts on a first side of the hub disc 11, namely, in the exemplary embodiment illustrated in FIGS. 1 to 6, on the side of this hub disc 11 remote from the friction disc 16.

In this exemplary embodiment, the friction washer 30 comprises an application washer 32 which is located between the hub disc 11 and the adjacent guide washer 12 and engaged to rotate on the latter by means of axial lugs 33 engaged in passages 34 in this guide washer 12, and which, on the side adjacent the hub disc 11, carries a friction lining 35 in contact with the latter.

The second friction washer 31 acts on the other side of the hub disc 11 and therefore, in the exemplary embodiment illustrated in FIGS. 1 to 6, on the side of the hub disc which is nearer the friction disc 16.

In practice, in this exemplary embodiment the friction washer 31 comprises a simple washer, the outer diameter of which is greater than that of the friction washer 30, and it is inserted axially between the radial collar 20 of the bearing 17 and the web of the friction disc 16 which rotates integrally with the adjacent guide washer 12, this web extending to the bearing 17 in this exemplary embodiment; in the case where this web does not extend as far as the bearing 17, the friction washer 31 is directly in contact with the adjacent guide washer 12.

In each case, there is, between the rotary part A and the friction washer 31, which contacts the rotary part B with at least one, and in the illustrated embodiment both its faces, at least one axial lug 38 which originate from either of the two elements consisting of the friction washer 31 and the rotary part A and is engaged with play in a passage 39 in the other of said elements.

Figure 2:
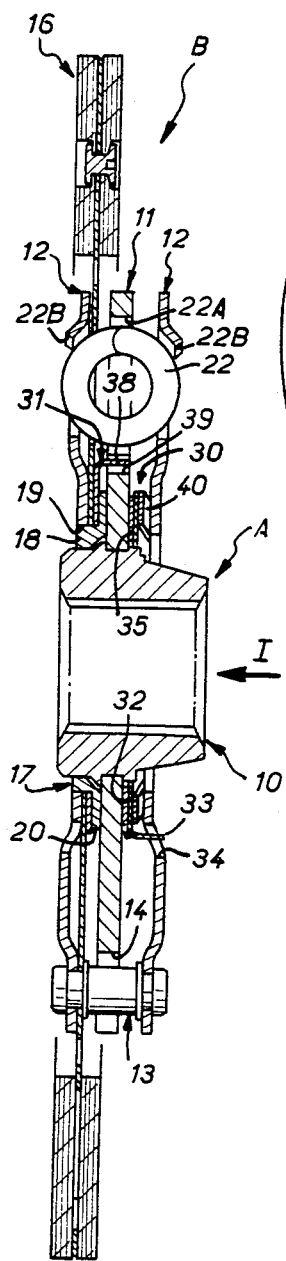
FIG. 2 is a view of this in an axial section along the broken line II—II of FIG. 1.
Figure 4:
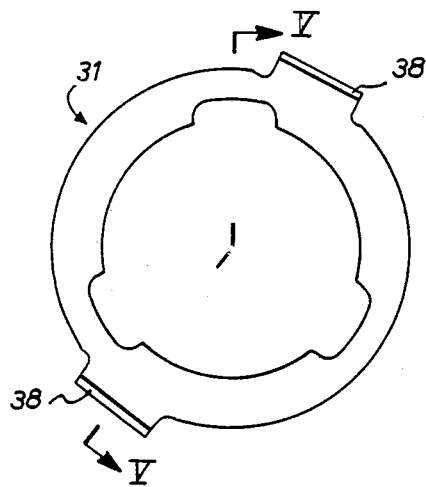
FIG. 4 is an elevation view of the friction washer also forming part of the torsion-damping device according to the invention, this friction washer being shown in isolation.
Figure 5:
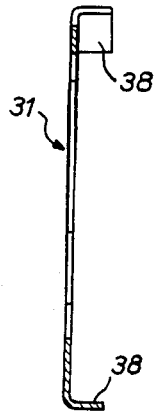
FIG. 5 is a view in an axial section of this friction washer along the line V—V of FIG. 4.

In the exemplary embodiment illustrated in FIGS. 1 to 6, there are two axial lugs 38, and these originate from the friction washer 31, FIGS. 2, 4 and 5.

These lugs 38 are disposed in positions diametrically opposite one another.

In conjunction with this, the passages 39 in which they are engaged are formed by notches made in the hub disc 11 at the base of the housing 22A which the latter possesses for housing the springs 22.

According to the invention, the lugs 38 each have a circumferential extent L1 and the passages 39 in which they are engaged each have a circumferential extent L2, and the values of these circumferential extents L1, L2 and those of the circumferential play J1, J2 associated with the springs 22A, as measured angularly, are such that the difference $[(J1+J2)-(L2-L1)]$ is between 0° and 5° and preferably between 1° and 5°.

In a conventional way, axially acting elastic means are, moreover, associated with the friction washers 30, 31.

In the exemplary embodiment illustrated, these consist of a corrugated washer 40, for example of the type sold under the name "ONDUFLEX", which is interposed between the friction washer 30 and the guide washer 12 on which the latter is engaged to rotate therewith.

Due to the fact that the friction washer 30 is held to rotate on the guide washer 12 and is also urged axially against the hub disc 11, it makes its effect felt over the entire length of the angular movement which is possible between the rotary parts A, B.

The same is true, on the other side of the hub, of the radial collar 20 of the bearing 17, this radial collar 20 being engaged to rotate on the corresponding guide washer 12 and being held applied against the hub disc 11.

In contrast to this, while the axial lugs 38 remain spaced from the circumferential ends of the corresponding passages 39 of the hub disc 11 through which they pass, the friction washer 31 according to the invention remains ineffectual.

In fact, the friction washer 31 is then rotated by the rotary part B, as it is inserted between two elements of the latter and there is no relative displacement between the friction washer and these two elements of the rotary part B.

However, when, in one direction of rotation or the other, these axial lugs 38 come to rest against the circumferential ends of the corresponding passages 39 through which they pass, the friction washer 31 is rotated with the hub disc 11 by these axial lugs 38, in the direction of rotation in question.

While this direction of rotation remains the same, that is to say while the direction of development of the torque remains the same, a relative displacement occurs, with a consequential development of friction, between the friction washer 31 and the two elements of the rotary part B between which it is disposed, the friction washer 31 then acting advantageously using both its faces.

From that moment, adding its effects to those of the friction washer 30 and of the radial collar 20 of the bearing 17, it minimizes the consequences of a possible rebound of the excited rotary part B relative to the exciting rotary part B.

Furthermore, because it is mounted to slide freely about the axis of the assembly, it advantageously intervenes without consequential compression of any one particular elastic means, which would be capable of subsequently restoring the energy stored during such compression.

The conditions are preferably such that the friction torque attributable solely to the friction washer 31 is a multiple of that attributable to the other friction means already in action; in the exemplary embodiment illustrated in FIGS. 1 to 6, this multiple is, for example, between 2 and 5.

Such a relationship between the friction torques in question can be plotted on a corresponding diagram, (not shown).

In the alternative embodiment illustrated in FIG. 7, the friction washer 31 is located on the same side of the hub disc 11 as the application washer 32 constituting the friction washer 30 and is disposed between the latter and the elastic washer 40; furthermore, in this alternative form, the passage 39 through which passes each axial lug 38 of the friction washer 31 is formed by an aperture in the hub disc 11 which is independent of the housing 22A in the latter.

It is thus possible to select the outside diameter of the friction washer 31 according to the particular applications intended, and this diameter can therefore be, if desired, less than or greater than that of the friction washer 30; preferably, however, and as illustrated, it is equal to this.

It should be noted that, for one and the same angular movement, the nearer the passage 39 in the hub disc 11 is to the axis of the assembly, the less material there is to remove from this hub disc 11.

It should also be noted that it is possible to form a prefabricated assembly with the guide washer 12 in question and the friction washers 30, 31, the lugs 33 of the application washer 32 constituting the friction washer being, for example, folded back beyond the guide washer 12 for this purpose.

The constructive arrangements of the embodiments of FIGS. 8 to 10 are substantially the same as those described with reference to FIG. 7, but, in addition, the friction washer 31 is inserted axially between two application washers 32, 42.

The first, application washer 32, is, as before, in contact with the hub disc 11 either directly or by way of a friction lining suitably attached thereto or a free friction washer, and it is connected in rotation to the nearest guide washer 12 by axial lugs 33, as before.

The second, application washer 42, is located between the friction washer 31 and the elastic washer 40 and is connected in rotation to the first application washer 32.

For example, FIGS. 8 and 9, the application washer 42 has as many recesses 43, in practice apertures as illustrated, as the application washer 32 has axial lugs 33, and by means of its recesses 43 it is engaged without play onto said axial lugs 33 of this application washer 32.

Alternatively, FIG. 10, the application washer 42 has itself axial lugs 44 engaged without play in recesses 45 in the adjacent guide washer 12.

In all cases, and as in the embodiment illustrated in FIGS. 1 to 6, the friction washer 31 contacts the rotary part B with both of its faces.

The same is true in the other alternative embodiments described below.

In the embodiments illustrated in FIGS. 11 to 14, since the application washer 32 is rotationally fast with the rotary part B and forms part of the latter, the axial lugs 38 provided between the friction washer 31 and such a rotary part B extend between said friction washer 31 and said application washer 32.

For this purpose, the passages 39 with which the axial lugs 38 co-operate are formed in the application washer 32.

These are, for example, and as illustrated, simple grooves or notches made in the outer periphery of this application washer, FIG. 12.

In this case, no passage which could be capable of lessening the mechanical strength of the hub disc 11 has to be made in the latter and furthermore the number of passages made in the guide washer 12 in question remains unchanged.

Moreover, in these embodiments, the friction washer 31 contacts the hub disc 11 with one of its faces, and, with its other face, contacts an intercalated washer 47 which is inserted between it and the application washer 32 and which is rotationally fast with the rotary part A.

For example, FIG. 11, this intercalated washer 47 can have, on its inner periphery, a toothing by means of which it engages, without play, with a complementary toothing formed on the hub 10.

Alternatively, this intercalated washer 47 can be crimped onto the hub 10 either directly in contact with the hub disc 11, by means of a crimping bead 48 common to this hub disc 11, FIG. 13, or spaced from the hub disc 11, by means of a crimping bead 49 separate from the crimping bead 48, FIG. 14.

It should be noted that, in this case, the friction washer 31 can constitute a prefabricated assembly with the rotary part A.

In the alternative embodiment illustrated in FIGS. 15 and 16, there is no application washer, but, as in the preceding embodiments, the friction washer 31 is inserted between the hub disc 11 and an intercalated washer 47 wedged in rotation on the hub 10, for example according to any one of the preceding arrangements.

The elastic washer 40 is directly in contact with this intercalated washer 47, and the passages 39 in which the axial lugs 38 of the friction washer 31 are engaged are formed by apertures made in the adjacent guide washer 12.

The embodiment illustrated in FIGS. 17 and 18 is similar in all respects to that described above with reference to FIGS. 8 and 9, with the difference that the lugs provided between the friction washer 31 and the rotary part A no longer extend axially, as before, but radially.

In the exemplary embodiment illustrated, these lugs 38 thus extend radially on the inner periphery of the friction washer 31, the passages 39 with which they co-operate being formed on the outer periphery of the hub 10.

As may be seen better in FIG. 18, the lugs 38 thus form a toothing, and the passages 39 also form a toothing similar to the preceding one, for engagement of the latter with play.

The alternative embodiment illustrated in FIG. 19 is similar in all respects to the embodiments described above with reference to FIGS. 15 and 16, with the difference that there is no elastic washer, at least on the side of the hub disc 11 where the friction washer 31 intervenes, the intercalated washer 47 associated with the latter then being directly in contact with the adjacent guide washer 12.

Figure 20:
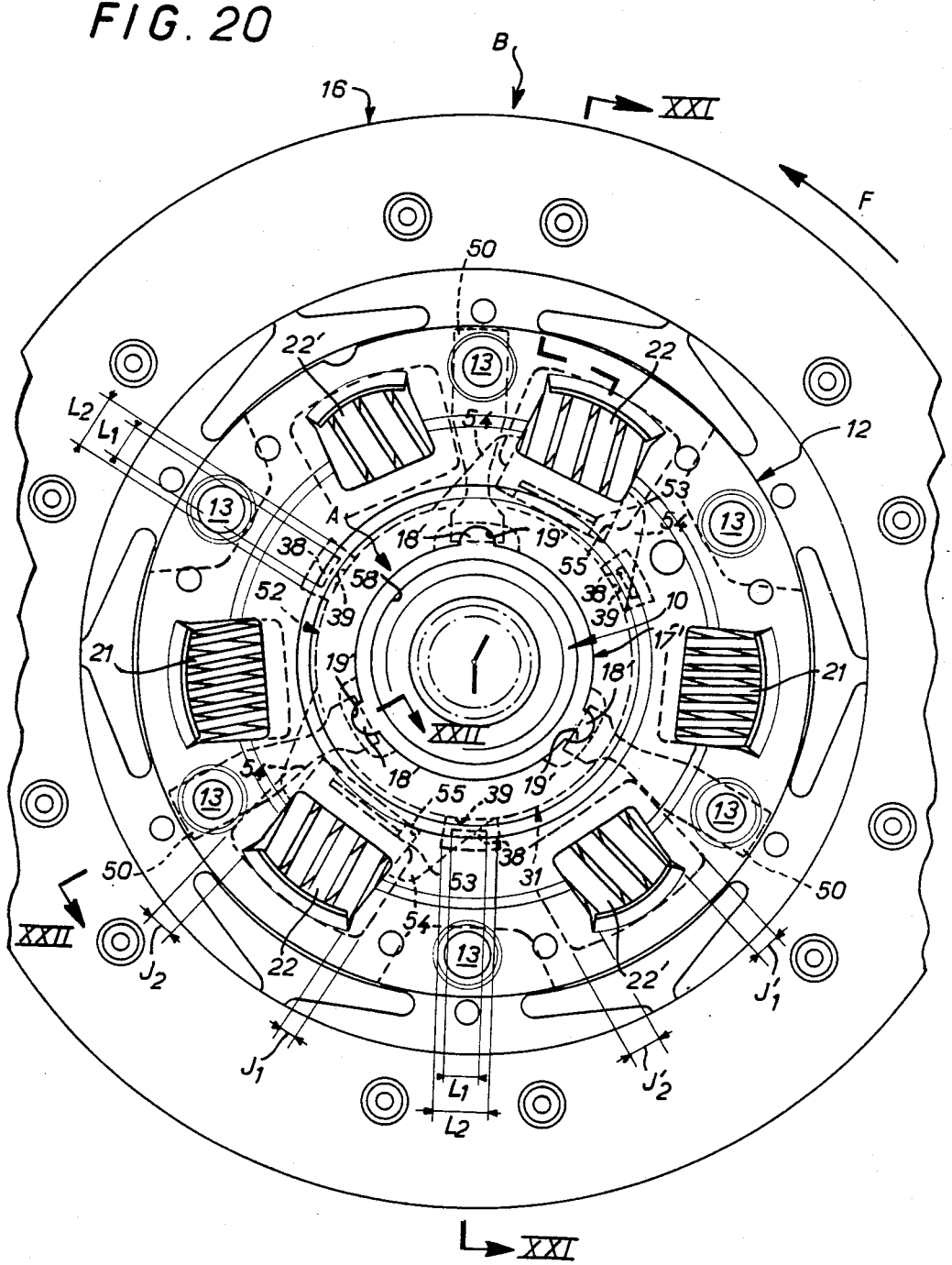

The embodiment illustrated in FIGS. 20 to 22 is substantially similar to that described above with reference to FIGS. 1 to 6, but with the following differences.

The friction washer 31 which, in this embodiment, is located on the side of the hub disc 11 remote from the friction disc 16, is inserted axially between the corresponding guide washer 12 and the radial collar 20' of a bearing 17' which, centered on said guide washer 12 by means of its outer periphery, is spaced from the hub 10, the latter having a groove 58 so that the only friction occurring on the side in question of the hub disc 11 is caused by the friction washer 31.

Associated with the friction washer on the side of the hub disc 11 nearer the friction disc 16 is a friction washer 52 which is inserted axially between the corresponding guide washer 12 and the radial collar 20 of the bearing 17 and which, in a way known per se, possesses, at least one axial lug 53 and at least two radial arms 54; the axial lug 53 is engaged, possibly with play, in a passage, in practice a notch 55, in the hub disc, to allow the friction washer 52 to come into action, and the radial arms 54 form a fork by means of which the latter is engaged on a spring 22 for its systematic return into a specific central position of rest.

Thus, in this case, a friction washer 31 with an indeterminate position of rest and random intervention has associated with it a friction washer which, in a conventional way, has a specific position of rest and the intervention of which is strictly programmed, again in a conventional way.

In the embodiment illustrated, the two friction washers 31 and 52 used in this way have the same diameter, and this can allow production in a single operation.

Finally, in the embodiment illustrated, these two friction washers are subjected to specific axially acting elastic means independently of one another.

These are elastically deformable strips 50 which extend radially and which, bearing on the axial struts 13 at their ends radially farther away from the axis of the assembly, act, at their ends radially nearer to said axis, some on the radial collar 20 of the bearing 17 and others on the radial collar 20' of the bearing 17', stressing these radial collars 20, 20' towards the respective adjacent guide washer 12.

Under the stress of these strips 50, the friction washers 31, 52 are thus each gripped individually between the respective adjacent guide washer 12 and the respective radial collar 20, 20' of the corresponding bearing 17, 17'.

In this embodiment, the friction torque caused by the friction washer according to the invention can be 5 to 15 times greater than that caused by the other friction means and, for example, 10 times greater than this.

As will be noted, in all the embodiments described and illustrated, the axial lugs 33 and/or 38 are all arranged along a circumference having a diameter less than that of the circumference on which the springs 21, 22, 22' are located.

However, the present invention is, of course, not limited to the embodiments described and illustrated, but embraces any alternative form and/or any alternative combination of their various elements.

In particular, the lug provided according to the invention between a friction washer and one of the rotary parts in question can, instead of originating from this friction washer, instead originate from said rotary part.

Moreover, the clutch plate assembly in question, instead of comprising only two coaxial parts mounted to rotate relative to one another, can comprise, in a manner known per se, three coaxial parts mounted to rotate in pairs relative to one another.

The scope of application of the invention is not limited, moreover, to clutch plate assemblies only, but extends more generally to that of torsion-damping devices.

Furthermore, the arrangements of the invention are not limited solely to the first group of springs to intervene; on the contrary, and especially when two groups of springs of relatively low rigidity are used, they can extend just as well, for example, to the second group of springs; in this case, in the definition of the invention, J'1 and J'2 must obviously be substituted for J1 and J2 respectively.

I claim:

1. A torsion-damping device, for an automotive clutch plate assembly, comprising at least two coaxial parts mounted to rotate relative to one another within predetermined limits of angular movement, elastic means operatively interposed circumferentially between said rotary parts, and friction means comprising at least two friction washers being interposed axially between said rotary parts, said elastic means comprising a first spring stage of at least one relatively low stiffness spring operative during small relative angular displacements between said rotary parts, said elastic means comprising a second spring stage of at least one relatively high stiffness, chordally oriented spring operative during larger relative angular displacements between said rotary parts, said second stage spring in the rest position of said torsion damping device being located partly, without circumferential play, in a housing formed in a first of the rotary parts and partly, with circumferential play J1 for one direction of rotation of said assembly and circumferential play J2 for the opposite direction, in another housing formed in the second of said rotary parts, friction torque caused by one of said friction washers being a multiple greater than 1 of the friction torque caused by the rest of said friction means of said torsion damping device operating at the same time, at least one lug associated with said one friction washer, at least one face of said one friction washer contacting a first of said two rotary parts, said one friction washer being freely slidably mounted about the axis of the torsion-damping device and the position of said one friction washer in the rest position of said torsion damping device being independent of the action of said springs of said elastic means, and said lug being disposed between said one friction washer and the second of said rotary parts, said lug being integral with a selected one of said one friction washer and said second rotary parts, said lug having a chordal length L1 and being received in a passage in the other of said friction washer and said second rotary part, said passages having a chordal length L2, the angles subtended by the chordal play J1, J2 and by the chordal lengths L1, L2 being such that the subtended angle corresponding to $[(J1+J2)-(L2-L1)]$ is between a value greater than 0° and no greater than 5°.

2. A torsion-damping device according to claim 1, in which both faces of said one friction washer contact said first rotary part.

3. A torsion-damping device according to claim 2, in which said one friction washer is disposed axially between two application washers, a first of said application washers being in contact with one of the rotary parts and connected for rotation to the other of said rotary parts and a second of said application washers is effectively connected for rotation to said first application washer.

4. A torsion-damping device according to claim 3, in which said first application washer has at least one axial lug to connect it for rotation with said other rotary part, said lug being received in a recess in said second application washer, so as to engage said second application washer on said first application washer without play.

5. A torsion-damping device according to claim 3, in which, independently of one another, said first application washer and said second application washer are each connected for rotation by at least one axial lug to said other rotary part.

6. A torsion-damping device according to claim 2, in which an application washer urged by axially acting elastic means is connected for rotation to one of said rotary parts, said one lug disposed between said friction washer and said second rotary part extending between said one friction washer and said application washer.

7. A torsion-damping device according to claim 2, in which said one friction washer is in contact with an interposed washer disposed between said one friction washer and said application washer and connected for rotation with said first rotary part.

8. A torsion-damping device according to claim 2, in which said first rotary part comprises a hub and a hub disc fixed for rotation with said hub, said one friction washer being disposed between said hub disc and an interposed washer connected for rotation with said hub.

9. A torsion-damping device according to claim 1, in which said lug extends radially.

10. A torsion-damping device according to claim 9, in which one of said rotary parts comprises a hub and the other of said rotary parts comprises at least one guide washer, a bearing being interposed between the hub and said guide washer, said bearing being in engagement with said guide washer to rotate therewith and said bearing comprising a radial collar extending substantially parallel to said guide washer, said one friction washer being interposed axially between said radial collar of said bearing and said guide washer with which said guide washer is fixed for rotation.

11. A torsion-damping device according to claim 10, in which said one friction washer is disposed between said radial collar of said bearing and a component fixed for rotation with said guide washer.

12. A torsion-damping device according to claim 1, in which said lug extends axially.

13. A torsion-damping device according to claim 12, in which one of said rotary parts comprises a hub and a hub disc integral with said hub whilst said other rotary part comprises at least one guide washer, the passage in which said lug is engaged being located in a selective one of said hub disc, said guide washer and an application washer engaged for rotation with one of said rotary parts.

14. A torsion-damping device according to claim 1, in which said friction means comprises another friction washer in contact with one of said rotary parts and having at least one axial lug received in a passage in the other of said rotary parts and also at least two radial arms engaged on said second spring.

15. A torsion-damping device according to claim 14, in which each of said friction washers is subjected to independent axially acting elastic means.

16. A torsion-damping device according to claim 1, in which said subtended angle corresponding to $[(J1+J2)-(L2-L1)]$ is between 1° and 5°.

17. A torsion-damping device according to claim 1, in which said lug is integral with said one friction washer.

18. A torsion-damping device according to claim 1, in which said lug is integral with said second rotary part.

19. A torsion-damping device according to claim 1, in which one of the rotary parts comprises a hub and a hub disc fixed for rotation with said hub, while the other of said rotary parts comprises at least one guide washer and one application washer urged by axially acting elastic means which bears on said guide washer, and is connected for rotation with said guide washer, said friction washer being located axially between said application washer and said guide washer.

20. A torsion-damping device according to claim 1, in which one of said rotary parts comprises a hub and a hub disc fixed for rotation with said hub, said one friction washer operating on a first side of said hub disc, the rest of said friction means operating on the other side of said hub disc.

21. A torsion damping device according to claim 1, with the friction torque caused by said one friction washer being a multiple greater than about 2 of the friction torque caused by the rest of said friction means of said torsion damping device operating at the same time.

22. A torsion damping device according to claim 1, with the friction torque caused by said one friction washer being a multiple greater than between about 2 and 5 of the friction torque caused by the rest of said friction means of said torsion damping device operating at the same time.

* * * * *